United States Patent
San Agustin Lopez et al.

(10) Patent No.: US 9,785,233 B2
(45) Date of Patent: Oct. 10, 2017

(54) SYSTEMS AND METHODS OF EYE TRACKING CALIBRATION

(71) Applicant: Facebook, Inc., Menlo Park, CA (US)

(72) Inventors: Javier San Agustin Lopez, Copenhagen (DK); Benjamin Antoine Georges Lefaudeux, Kobenhavn (DK)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/683,831

(22) Filed: Apr. 10, 2015

(65) Prior Publication Data

US 2016/0011658 A1    Jan. 14, 2016

Related U.S. Application Data

(60) Provisional application No. 61/978,366, filed on Apr. 11, 2014.

(51) Int. Cl.
*G06F 3/01* (2006.01)
*G06F 1/16* (2006.01)
(Continued)

(52) U.S. Cl.
CPC ............ *G06F 3/013* (2013.01); *G06F 1/1626* (2013.01); *G06F 1/1632* (2013.01);
(Continued)

(58) Field of Classification Search
CPC .... G06F 1/1626; G06F 1/1632; G06F 1/1686; G06F 3/01–3/013; G06K 9/00597–9/00617; G06K 9/52–9/527
See application file for complete search history.

(56) References Cited

U.S. PATENT DOCUMENTS 7,986,816 B1    7/2011  Hoanca et al.
8,686,943 B1 *  4/2014  Rafii ................. G06F 3/017
                                                    345/158
(Continued)

FOREIGN PATENT DOCUMENTS

CN    105247447 A    1/2016
EP      2956844 A2   12/2015
(Continued)

OTHER PUBLICATIONS

U.S. Appl. No. 14/180,974, filed Feb. 14, 2014, Systems and Methods of Eye Tracking Calibration.
(Continued)

*Primary Examiner* — Nathan Danielsen
(74) *Attorney, Agent, or Firm* — Fenwick & West LLP

(57) ABSTRACT

An image of a user's eyes and/or face, captured by a camera on the computing device or on a device coupled to the computing device, may be analyzed using computer-vision algorithms, such as eye tracking and gaze detection algorithms, to determine the location of the user's eyes and estimate the gaze information associated with the user. A user calibration process may be conducted to calculate calibration parameters associated with the user. These calibration parameters may be taken into account to accurately determine the location of the user's eyes and estimate the location on the display at which the user is looking. The calibration process may include determining a plane on which the user's eyes converge and relating that plane to a plane of a screen on which calibration targets are displayed.

18 Claims, 13 Drawing Sheets

(51) Int. Cl.
G06K 9/52 (2006.01)
G06K 9/00 (2006.01)
(52) U.S. Cl.
CPC ......... *G06F 1/1686* (2013.01); *G06K 9/0061* (2013.01); *G06K 9/00597* (2013.01); *G06K 9/52* (2013.01)

(56) References Cited

U.S. PATENT DOCUMENTS

| | | | | |
|---|---|---|---|---|
| 8,885,882 | B1* | 11/2014 | Yin | G06F 3/013 382/103 |
| 2005/0175218 | A1* | 8/2005 | Vertegaal | G06F 3/013 345/157 |
| 2006/0227116 | A1 | 10/2006 | Zotov et al. | |
| 2011/0182501 | A1* | 7/2011 | Mercier | G06K 9/527 382/159 |
| 2011/0254865 | A1 | 10/2011 | Yee et al. | |
| 2011/0310006 | A1 | 12/2011 | Edwards et al. | |
| 2012/0019662 | A1 | 1/2012 | Maltz | |
| 2012/0272179 | A1* | 10/2012 | Stafford | G06F 3/012 345/157 |
| 2013/0156265 | A1* | 6/2013 | Hennessy | G06F 3/013 382/103 |
| 2014/0085198 | A1 | 3/2014 | Jahnke et al. | |
| 2014/0226131 | A1 | 8/2014 | Lopez et al. | |
| 2015/0084864 | A1 | 3/2015 | Geiss et al. | |
| 2016/0139665 | A1 | 5/2016 | Lopez et al. | |

FOREIGN PATENT DOCUMENTS

| | | |
|---|---|---|
| WO | WO-0133323 A2 | 5/2001 |
| WO | WO-2012052061 A1 | 4/2012 |
| WO | WO-2014125380 A2 | 8/2014 |
| WO | WO-2015154882 A1 | 10/2015 |
| WO | WO-2016075532 A1 | 5/2016 |

OTHER PUBLICATIONS

"U.S. Appl. No. 14/180,974, Non-Final Office Action dated Oct. 7, 2015", 13 pgs.
"U.S. Appl. No. 14/180,974, Response filed Jan. 5, 2016 to Non-Final Office Action dated Oct. 7, 2015", 14 pgs.
"U.S. Appl. No. 14/180,974, Final Office Action dated Mar. 28, 2016", 16 pgs.
"Chinese Application Serial No. 201480020096.6, Preliminary Amendment filed Apr. 14, 2016", W/ English Claims, 22 pgs.
"European Application Serial No. 14732364.6,Office Action dated Mar. 28, 2016", 3 pgs.
"International Application Serial No. PCT/IB2015/002218, International Search Report dated Apr. 1, 2016", 4 pgs.
"International Application Serial No. PCT/IB2015/002218, Written Opinion dated Apr. 1, 2016", 6 pgs.
Blignaut, Pieter, et al., "TrackStick: a data quality measuring tool for Tobii eye trackers", Proceedings of the Symposium on Eye Tracking Research and Applications, (2012), 293-296.
Santella, Anthony, et al., "Robust Clustering of Eye Movement Recordings for Quantifaction of Visual Interest", Symposium on Eye Tracking Research and Applications, (2004), 1-8.
"International Application Serial No. PCT/EP2015/000755, International Search Report dated Jun. 9, 2015", 4 pgs.
"International Application Serial No. PCT/EP2015/000755, Written Opinion dated Jun. 9, 2015", 8 pgs.
Joshua, Borah, "Eye movement, measurement techniques for introduction", Encyclopedia of Medical Devices and Instrumentation, Second Edition, XP055196246, ISBN: 978-0-47-126358-6, Retrieved from the Internet: <http://onlinelibrary.wiley.com/store/10.1002/0471732877.emdll2/asset/emdll2.pdf?v=l&t=iazepui9&s=e27c8b48342ad445e2821290a3c84564f8694987>, (Apr. 14, 2006), 263-286.
Shibin, Yin, et al., "A Vision-Based Self-Calibration Method for Robotic Visual Inspection Systems", Sensors, vol. 13, No. 12, XP055186944, ISSN: 1424-8220, DOI: 10.3390/s131216565page 16575, lines 1-3, (Dec. 3, 2013), 16565-16582.
"U.S. Appl. No. 14/180,974, Non Final Office Action dated Nov. 15, 2016", 15 pgs.
"U.S. Appl. No. 14/180,974, Response filed Aug. 23, 2016 to Final Office Action dated Mar. 28, 2016", 15 pgs.
"European Application Serial No. 14732364.6, Response filed Jul. 15, 2016 to Office Action dated Mar. 18, 2016", 22 pgs.
"International Application Serial No. PCT/EP2015/000755, International Preliminary Report on Patentability dated Oct. 20, 2016", 10 pgs.
"DynaVox Announces the EyeMax: New Eye Gaze System Provides Greater Independence", [Online]. Retrieved from the Internet: <URL: http://www.dynavoxtech.com/company/press/release/detail.aspx?id=11>, (Aug. 6, 2008), 2 pgs.
"International Application Serial No. PCT/IB2014/000772, International Preliminary Report on Patentability dated May 22, 2015", 30 pgs.
"International Application Serial No. PCT/IB2014/000772, International Search Report dated Aug. 13, 2014", 4 pgs.
"International Application Serial No. PCT/IB2014/000772, Written Opinion dated Feb. 9, 2015", 9 pgs.
"International Application Serial No. PCT/1B2014/000772, Written Opinion dated Aug. 13, 2014", 8 pgs.
"Tobii Eye Tracking", White Paper, Tobii Technology AB, (Jan. 27, 2010), 14 pgs.
Fehringer, Benedict, et al., "Analysing the Potential of Adapting Head-Mounted Eye Tracker Calibration to a New User", International Symposium on Eye Tracking Research and Applications (ETRA), (2012), 4 pgs.
Jacob, Robert, "Eye Tracking in Advanced Interface Design", (2003), 53 pgs.
Ramanauskas, N, "Calibration of Video-Oculographical Eye-Tracking System", Electronics and Electrical Engineering. No. 8(72), (2006), 65-68.
Zoccolan, Davide, et al., "A Self-Calibrating, Camera-based Eye Tracker for the Recording of Rodent Eye Movements", Frontiers in Neuroscience. vol. 4, Article 193, (Nov. 29, 2010), 1-12.

\* cited by examiner

SYSTEMS AND METHODS OF EYE TRACKING CALIBRATION

PRIORITY CLAIM

This application claims the benefit of U.S. Provisional Patent Application No. 61/978,366, entitled "Systems and Methods of Eye Tracking Calibration," filed on Apr. 11, 2014, which is hereby incorporated herein by reference in its entirety.

TECHNICAL FIELD

The present disclosure generally relates to eye tracking control and, more specifically, to systems and methods for facilitating eye tracking control calibration.

BACKGROUND

An eye tracking system composed of a camera and a display tracks eye movement of a user to determine a position on the display that is the target of the user's gaze. The location of the user's gaze on the screen is used to control an application presented on the display. The position of the camera relative to the display is predetermined.

BRIEF DESCRIPTION OF THE DRAWINGS

Some embodiments are illustrated by way of example and not of limitation in the figures of the accompanying drawings.

DETAILED DESCRIPTION

Figure 1:
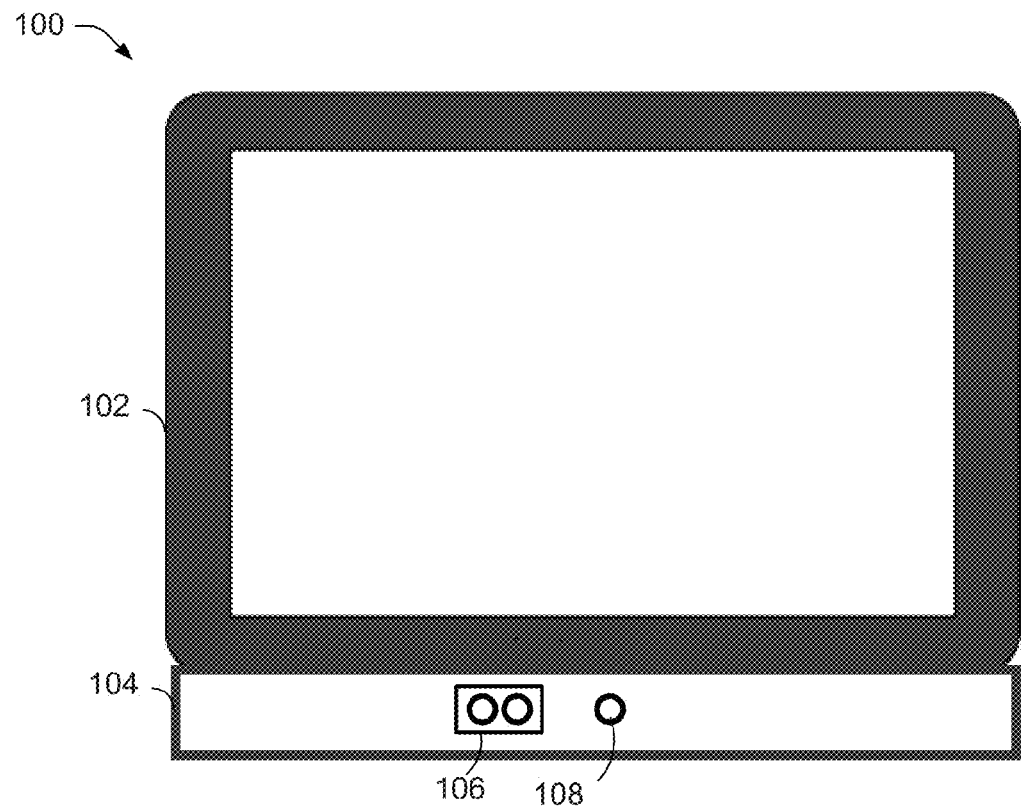
FIG. 1 is a device diagram of an example computing device coupled to a docking device capable of facilitating eye tracking control, according to some example embodiments.

Example systems and methods to facilitate eye tracking control calibration are described. In the following description, for purposes of explanation, numerous specific details are set forth in order to provide a thorough understanding of example embodiments. It will be evident, however, to one skilled in the art that the present technology may be practiced without these specific details.

A user of a computing device may interact with and control objects and applications displayed on the computing device through the user's eye movement. An image of the user's eyes and/or face, captured by a camera on the computing device or on a device coupled to the computing device, may be analyzed using computer-vision algorithms, such as eye tracking and gaze detection algorithms. For example, the captured images may be processed to extract information relating to features of the user's eyes and/or face. The computing device may then use the extracted information to determine the location of the user's eyes and estimate the gaze information associated with the user. Gaze information of a user may be an estimation of where the user is looking and may include information such as a user's line of sight, point of regard information (e.g., a location on the display at which the user is looking), the direction of the user's gaze, and the like. For example, the computing device may be able to estimate at which icon on the display the user is looking. The estimation of where the user is looking may be used to direct one or more objects, applications, and the like to perform a particular operation. For example, the user may direct and control the movement of an object on the screen depending on where the user is looking on the display of the computing device, including controlling scrolling functions, the movement of objects in a virtual game, controlling the pointer and cursor position, and the like. The estimation of where the user is looking may also be used to analyze the areas or objects displayed on the screen that appear to attract the attention of the user, or the estimation may be used to study the objects a user looks at on a graphical user interface. For example, the design of an application user interface may be improved using eye tracking information indicating areas or objects attracting the users' attention so that users have a better experience when interacting with the application.

A user calibration process may be conducted when the user begins using the computing device in order to calculate calibration parameters associated with the user. These calibration parameters may be taken into account to accurately determine the location of the user's eyes and estimate the location on the display at which the user is looking. The calibration parameters may also be taken into account to determine the direction of the user's eye gaze as a three-dimensional (3-D) vector in space (e.g., line of sight). In such case, information about the hardware geometry (e.g., camera parameters, the location of the screen with respect to the camera, or any suitable combination thereof) may be used in the determination of the direction of the user's gaze.

FIG. 1 is a device diagram 100 of an example computing device 102 coupled to a docking device 104 capable of facilitating eye tracking control. The computing device 102 may be any type of computing device, including, but not limited to, a smart phone, a personal digital assistant (PDA), a mobile phone, a computing tablet, an electronic reader, a television, a laptop, a desktop computer, a display device, a head-mounted display, or any suitable combination thereof. During eye tracking control, the computing device 102 may be used by the user by holding the computing device 102 with one or both hands, or while the computing device 102 is on a stand or resting on a surface.

A docking device 104 may be coupled to the computing device 102 in any manner, such as through a universal serial bus (USB) port on the computing device 102, micro USB port on the computing device 102, and the like. While the docking device 104 of FIG. 1 is depicted at the bottom of the computing device 102, one of ordinary skill in the art will appreciate that the docking device 104 may be located at any suitable location relative to the computing device 102. The docking device 104 may include a camera module 108 and one or more light-emitting diodes (LEDs) 106. For explanatory purposes, LEDs 106 are depicted and described throughout the disclosure. However, one of ordinary skill in the art will appreciate that any appropriate light-emitting source may be used (e.g., infrared laser).

The docking device 104 may include any number of infrared LEDs 106 that may be placed in a suitable location in any manner within the docking device 104 (e.g., tilted at an angle such that it points toward the user's face). In a specific embodiment, the one or more LEDs 106 may be synchronized with the one or more cameras in such a manner that the one or more LEDs 106 are turned on when the one or more cameras are grabbing a frame, and turned off otherwise. In some embodiments, the LEDs 106 may be turned off if no movement has been detected or if the docking device 104 and/or computing device 102 go into a sleep mode.

In some embodiments, the docking device 104 may also include a suitable type of pass filter (e.g., active, mechanical, high-pass, band-pass, etc.). In some embodiments, a high-pass filter that blocks light below 800 nm and allows light above 800 nm is used. In some embodiments, an infrared band pass filter may only allow light between 800-900 nm to enter the one or more cameras of the camera module 108.

The camera module 108 includes one or more front-facing cameras placed in any suitable location in any manner within the docking device 104 (e.g., tilted at an angle such that it points toward the user's face) and may be used to capture images of the user's eyes and/or face. The one or more cameras may be placed at an appropriate distance from the LEDs 106 to optimize the proper capture of the infrared light. In some embodiments, a camera on the computing device 102 is used in combination with camera module 108 in stereo mode. In some embodiments, the camera module 108 may include any one or more of the following: a black and white (e.g., monochrome), color (e.g., RGB) or IR-RGB sensor, running at an appropriate frame-per-second rate (e.g., high-definition at 30 frames per second), a lens without an infrared block filter and with an appropriate field of view and depth of field (e.g., approximately 30-80 cm for a mobile device, and approximately 2-5 meters for a television), and the like. The one or more cameras in the camera module 108 may be positioned such that the one or more cameras are tilted toward a user's face.

The images captured by the camera may be rotated by the eye tracking software, the processing of the images may be adapted to compensate for the input orientation, or any suitable combination thereof. For example, the eye tracking software can use sensors on the computing device 102 (e.g., accelerometer, magnetometer, etc.) to detect the orientation of the computing device 102 and rotate the image or apply pre-processing settings to compensate for the orientation of the device so that the image can be properly processed.

The LEDs 106 emit light (e.g., infrared light) that may be focused and centered toward the eyes of the user. The light from the LEDs 106 is reflected in the pupil and on the cornea of the user and recorded by the cameras in the camera module 108. In some example embodiments, the LEDs 106 are synchronized with the one or more cameras so that the LEDs 106 are on only when the one or more cameras are grabbing an image. In some example embodiments, the visible light below 800 nm is filtered out using an infrared pass filter. Such filtering may improve the image quality. The field of view and depth of view of the lenses of the one or more cameras in the camera module 108 may allow the user to move around, thereby accommodating for head pose variance of the user. The eye tracking control software may analyze the images taken by the camera module 108 to provide screen coordinates (e.g., (x, y) or (x, y, z)) of where the user is looking on the display of the computing device 102. These coordinates may be used for any number of applications (e.g., scrolling, moving objects, selecting icons, playing games, etc.).

The LEDs 106 and the camera module 108 may be turned on and/or off in any manner, such as by utilizing an external slider, an on-off dedicated button on the side or on the back of either the computing device 102 or the docking device 104, controlled by an application or a digital button on the screen, controlled by movement or shaking of the computing device 102 and/or the docking device 104, controlled by voice commands, on-screen capacitive buttons, touch pad (s), bio-signals (e.g., EMG, EEG, etc.), remote control, hand and/or figure gestures, or any suitable combination thereof. As such, in some example embodiments, the eye tracking components consume power only while the LEDs 106 and the camera are turned on (e.g., when the user is using the eye tracking features).

In some embodiments, the eye tracking features are optimized when the camera is located at the bottom of the computing device 102 (e.g., with respect to the perspective of the user). The user may rotate the computing device 102 coupled to the docking device 104 to properly orient the camera module 108 such that it is located at the bottom of the computing device 102. In some embodiments, one or more of the accelerometer and/or magnetometer of the computing device 102, the LEDs, the pass filter, and the camera are turned on and/or off depending on the orientation of the computing device 102 and the docking device 104. For example, the LEDs and the camera may be turned off when the computing device 102 and the docking device 104 are rotated such that the camera module 108 is located at the top of the computing device 102 with respect to the perspective of the user.

The LEDs and the camera may be turned off when the user's face is not detected for a predetermined amount of time (e.g., 5-10 seconds) and may turn on again when the user's face or parts of the user's face (e.g., the user's eyes) is detected.

Figure 2:
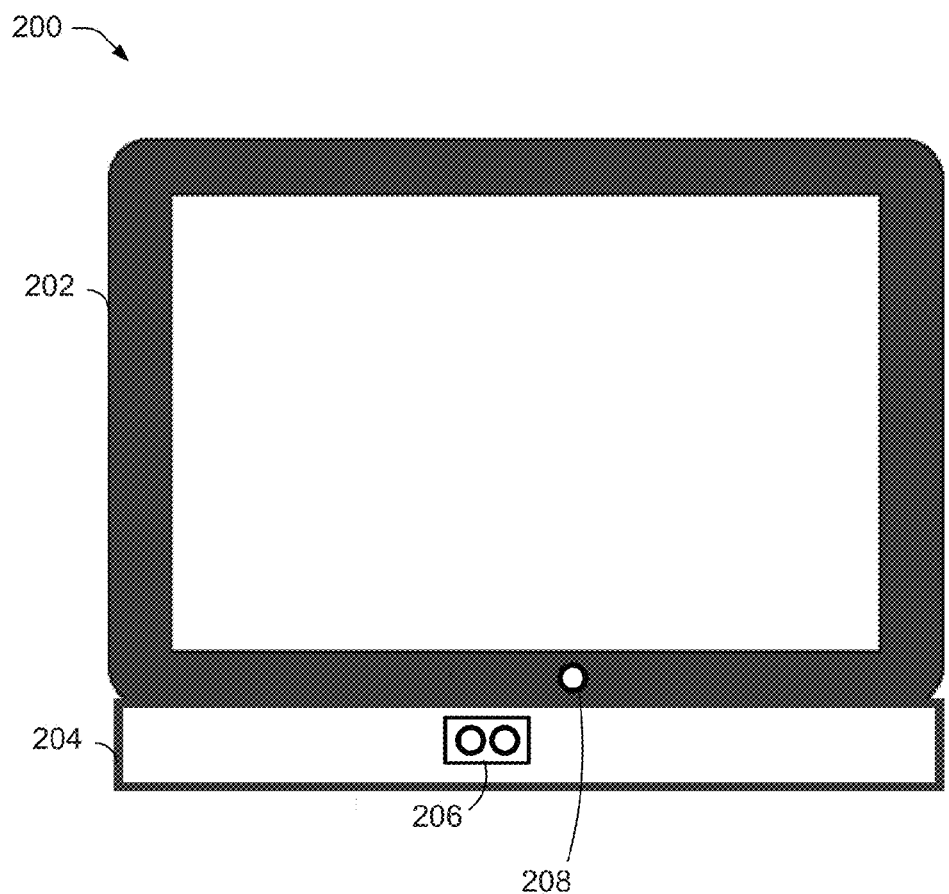
FIG. 2 is a device diagram of another example of a computing device coupled to a docking device capable of facilitating eye tracking control, according to some example embodiments.

FIG. 2 is a device diagram 200 of another example of a computing device 202 coupled to a docking device 204 capable of facilitating eye tracking control. The example shown in FIG. 2 may operate similarly to the example shown in FIG. 1 and may incorporate any one or combination of features described for FIG. 1. However, FIG. 2 shows that the docking device 204 may be integrated with LEDs 206, and the camera module 208 of the computing device 202 may be used (instead of or in addition to the camera module 208 integrated with the docking device 204). In some embodiments that couple the computing device 202 with the docking device 204 using a USB, a micro-USB port, or a proprietary port, the configuration depicted in FIG. 2 may allow for faster transfer of images from the camera since the camera of the computing device 202 is used to capture the images. The front-facing camera for eye tracking control may be utilized while simultaneously utilizing one or more front-facing and back-facing cameras.

Figure 3A:
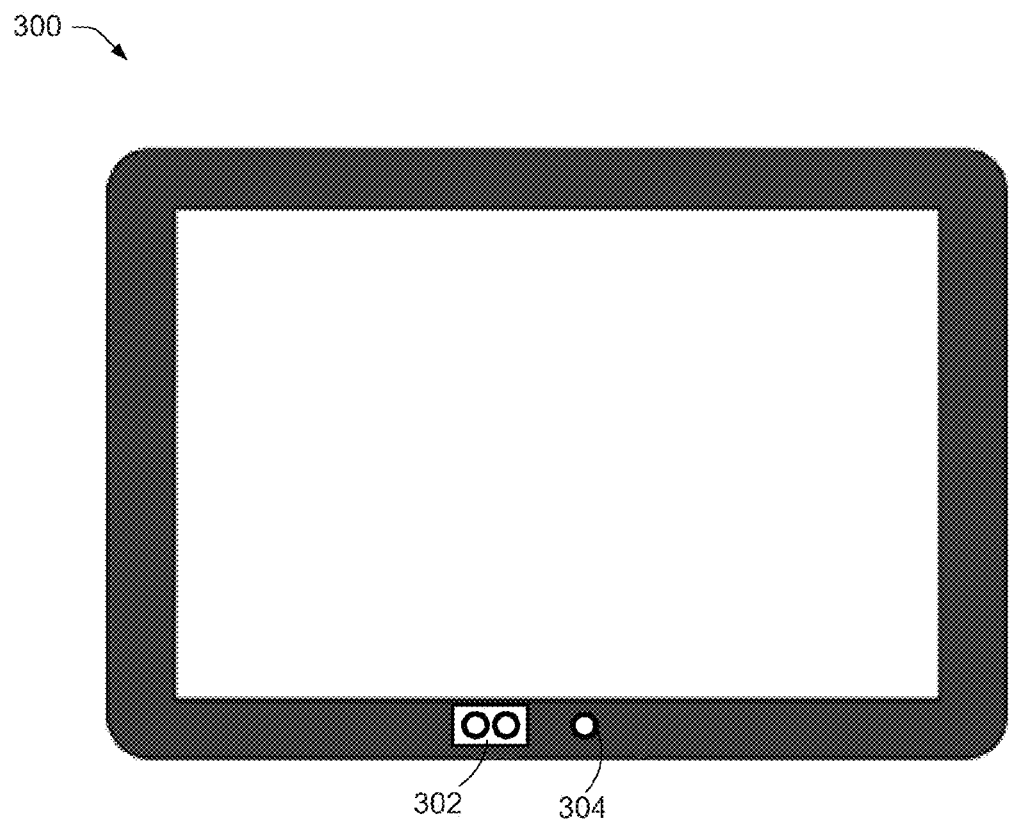
FIGS. 3A-3D are device diagrams of example computing devices capable of facilitating eye tracking control, according to some example embodiments.
Figure 3B:
Figure 3C:
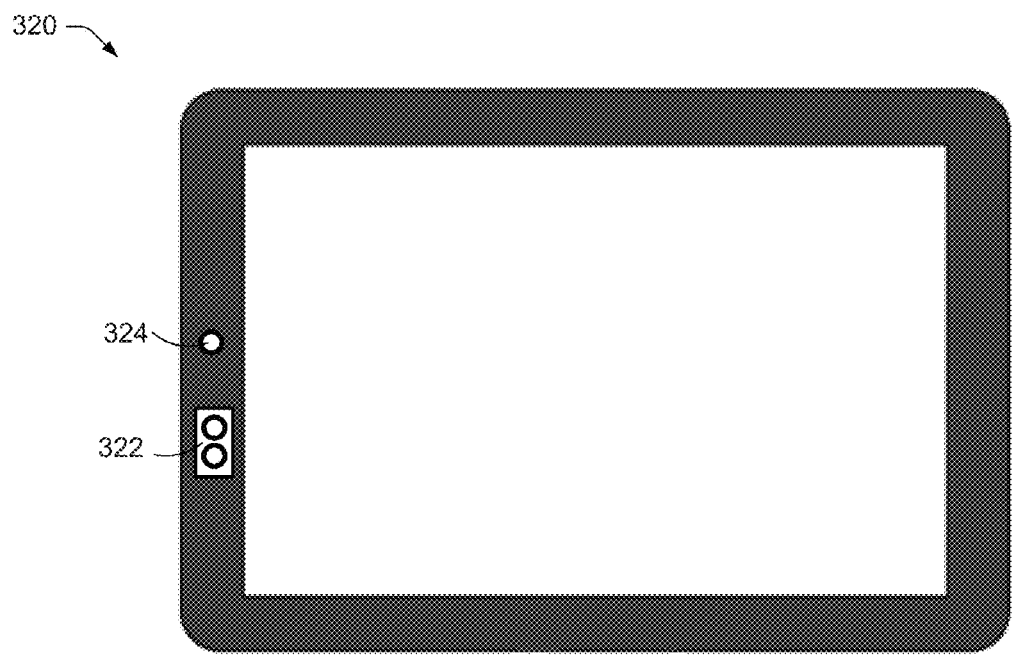

FIGS. 3A-3D are device diagrams of example computing devices capable of facilitating eye tracking control. The examples shown in FIGS. 3A-3C may operate similarly to the example shown in FIG. 1 and may incorporate any one or combination of features described for FIG. 1. However, the LEDs and camera modules are integrated into the computing device (instead of being part of a docking device). FIGS. 3A-3C depict computing devices 300, 310, and 320, respectively, with LEDs 302, 312, and 322 and camera modules 304, 314, and 324 integrated into the computing devices 300, 310, and 320 in different example configurations (with respect to the user's perspective).

The LEDs 302, 312, and 322 and the camera modules 304, 314, and 324 on the computing devices 300, 310, and 320 may be located in any one of a number of configurations on the computing devices 300, 310, 320. FIG. 3A shows the LEDs 302 and the camera module 304 being located at the bottom of the computing device 300. FIG. 3B shows the LEDs 312 being located on one side of the computing device 310 while the camera module 314 is located on the opposite side of the computing device 310. FIG. 3C shows the LEDs 322 and the camera module 324 being located on the same side of the computing device 320.

Figure 3D:
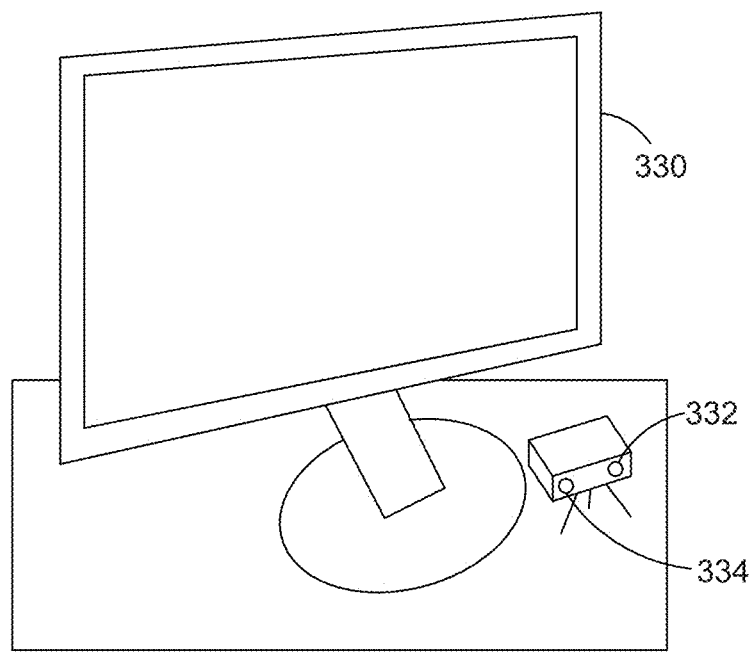

FIG. 3D illustrates an eye tracking device with camera module 334 and LEDs 332 that are not attached to the screen of the computing device 330. When the eye tracking device is not in a fixed position relative to the screen, additional calibration may be used to compensate.

Figure 4:
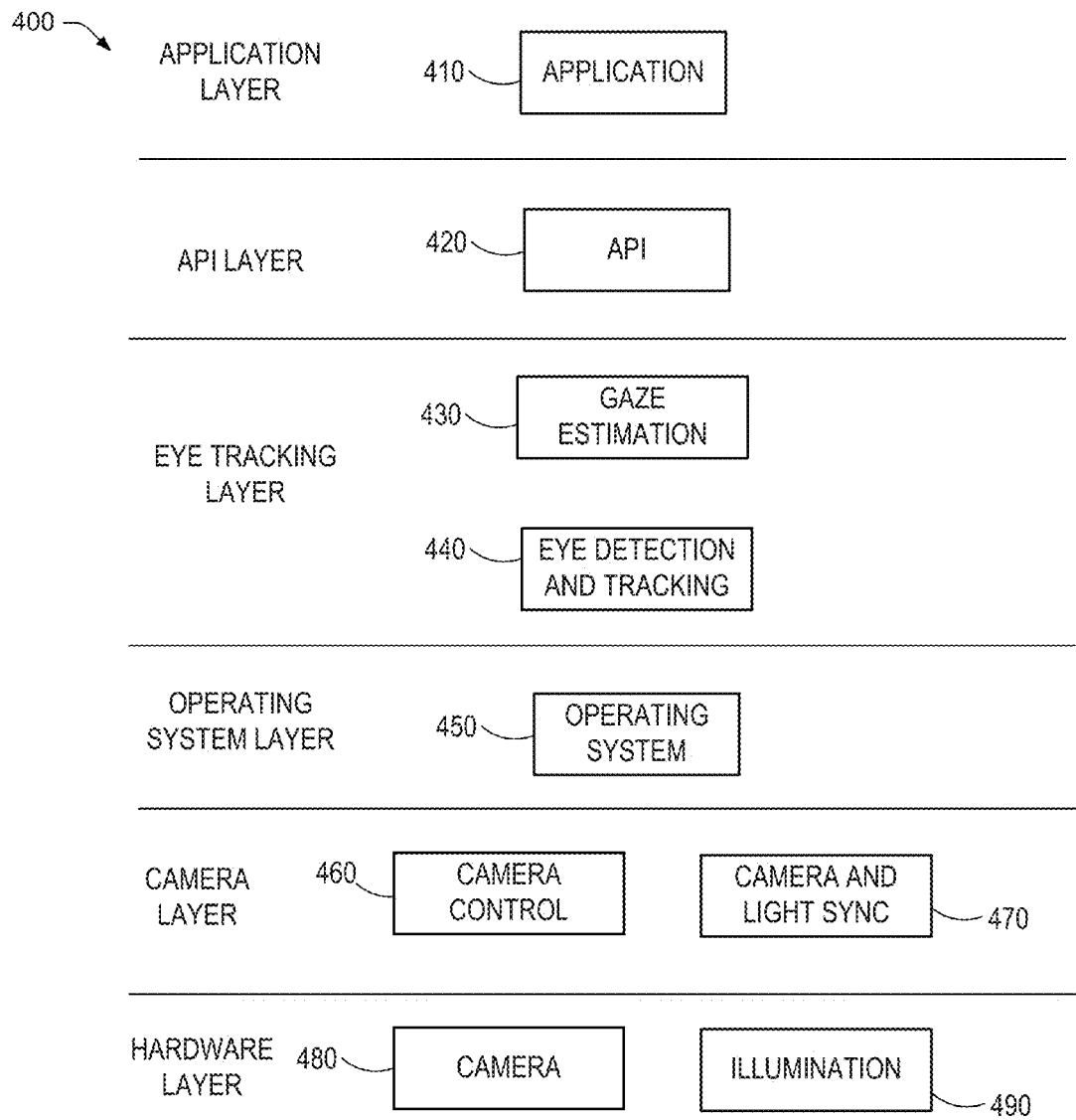
FIG. 4 is a block diagram of an example software architecture for facilitating eye tracking control, according to some example embodiments.

FIG. 4 is a block diagram of an example software architecture 400 for facilitating eye tracking control. Any one or more of the components of the software architecture 400 may run on either a control processing unit (CPU) of a computing device (e.g., the computing device 102, 202, 300, 310, 320, or 330) or on a combination of a CPU and a graphics processing unit (GPU) of the computing device. In some example embodiments, one or more of the components of the software architecture 400 run on a dedicated chip. The software may run as a background process (e.g., as part of the operating system (OS) or in a web browser) and may provide an application programming interface (API) that other applications can access. The API may fire an event or use some other similar mechanism to send the information of where the user is looking on the screen to other applications. One of ordinary skill in the art will appreciate that additional or fewer elements may be included in the example software architecture 400 shown in FIG. 4.

The software architecture 400 may be divided into different layers. The bottom layer may include a camera module 480 and an illumination module 490 that correspond to the respective hardware. A camera layer may include a camera control module 460 that is in charge of communicating with each camera in order to perform camera operations such as starting the camera, grabbing images, controlling the camera properties, triggering the sensor to grab an image, or any suitable combination thereof. The camera control module 460 may also include the circuitry to process the images delivered by the camera module 480. For instance, the camera control module 460 may include a processor (e.g., an ISP) that may optimize image quality, detect regions of interest on the image, crop the image delivered by the camera module 480, etc. The camera layer may also include a camera and light sync module 470, which synchronizes the cameras and the emitters (e.g., infrared emitters) so that the lights are controlled in such a way that tracking of the user's eyes is improved, gaze accuracy is increased, energy consumption is minimized, or any combination thereof. In some example embodiments, the eye tracking algorithms are used to optimize the illumination by decreasing or increasing the amount of light depending on parameters issued by the eye tracking engine or the camera control module 460. In some example embodiments, the camera layer is configured to strobe lights (e.g., infrared LEDs) at the frequency of the camera trigger output. In some example embodiments, this synchronization is achieved by using one or more trigger signals provided by the camera layer to the camera module 480 and the illumination module 490.

Once an image is captured by the sensor of the camera module 480, the image is sent to the eye tracking circuitry for further processing (e.g., detection of eye features and calculation of gaze direction or point of regard). In some embodiments, the camera layer delivers images to the camera control module 460, which processes the images before delivering them to the eye tracking layer. In the eye tracking layer, an eye detection and tracking module 440 may process images to find features like eye region location, pupil center, pupil size, location of the corneal reflections, eye corners, iris center, iris size, or any suitable combination thereof. These features may be used by the gaze estimation module 430 in the gaze estimation stage, which may be in charge of calculating the point of regard of the user. The gaze estimation module 430 may also calculate the optical and visual axes of the user's eyes and calibrate the calculation based on specific features of the user.

The API layer may be used for communication between the eye tracking layer and applications that use eye gaze information. An API module 420 may send data calculated by the eye tracking layer, such as coordinates of the point of regard, three-dimensional (3D) vector of the user's gaze direction, pupil size, blink rates, or any suitable combination thereof. The API module 420 may also accept commands from an application to the eye tracking layer (e.g., to start and/or stop the eye tracking engine, query for specific information, change the mode in which the eye tracking engine works, etc.). An application module 410 may connect to the eye tracker's API module 420 and use eye gaze information for any suitable purpose (e.g., control an app or a game, record eye data for future use, determine the drowsiness level of a driver, measure a person's interest in a particular object, or any suitable combination thereof).

Figure 5:
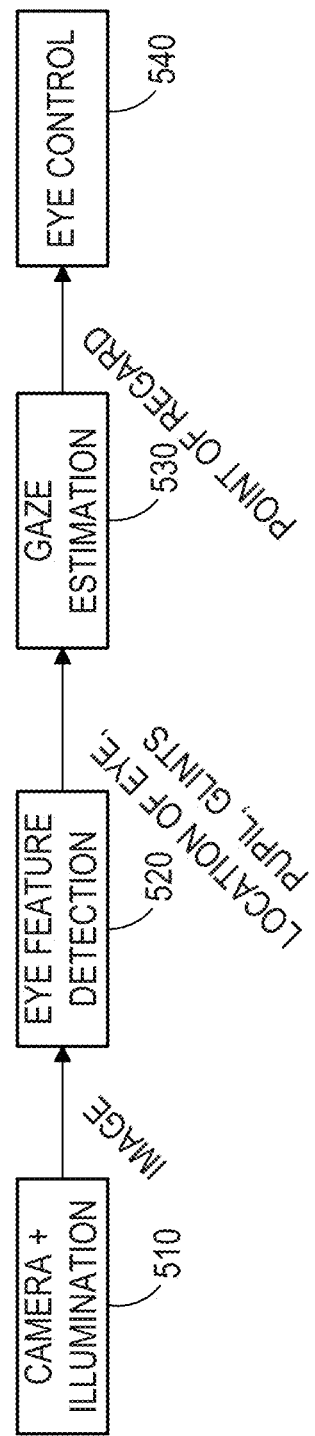
FIG. 5 is a block diagram of an example flow of data used to facilitate eye tracking control, according to some example embodiments.

FIG. 5 is a block diagram of an example flow of data used to facilitate eye tracking control. The one or more cameras and the illumination modules 510 (e.g., providing illumination via infrared LEDs) may capture an image of the user's eye or eyes. The eye feature detection module 520 may use the captured data to detect eye features (e.g., location of eye(s), pupils, corneal reflections, etc.). Using the detected eye features, the gaze estimation module 530 may estimate the user's point of regard, which may then be used to control aspects of an application through the eye control module 540.

A calibration process may be conducted when the user initially uses the eye tracking functionality in order to calculate calibration parameters specific to the user (e.g., vertical and horizontal offset between optical and visual axes) and/or to calculate parameters of a mapping function that may map eye features on the image coordinate system to the screen coordinate system. These calibration parameters and the information of the face and eyes are then employed to estimate where the user is looking on the screen and/or the user's line of sight through a gaze estimation algorithm. Any suitable calibration process may be used to calculate the calibration parameters specific to the user. The calibration parameters specific to the user may include any relevant parameters, such as an offset between optical and visual angles, the cornea radius, the distance between cornea center and pupil center, and the like. In some embodiments, a generic regression polynomial may be used to map image data to screen coordinates, and the calibration parameters may include the coefficients of that polynomial.

In order to accommodate a user moving around while maintaining accuracy in the estimated gaze coordinates, a hardware-calibrated setup may be used such that the relative size, location, and characteristics of the hardware components in 3-D space are known, including screen size, the location and relative angle of the one or more cameras with respect to the screen, the location of the light sources, intrinsic camera parameters, and the like.

Figure 6A:
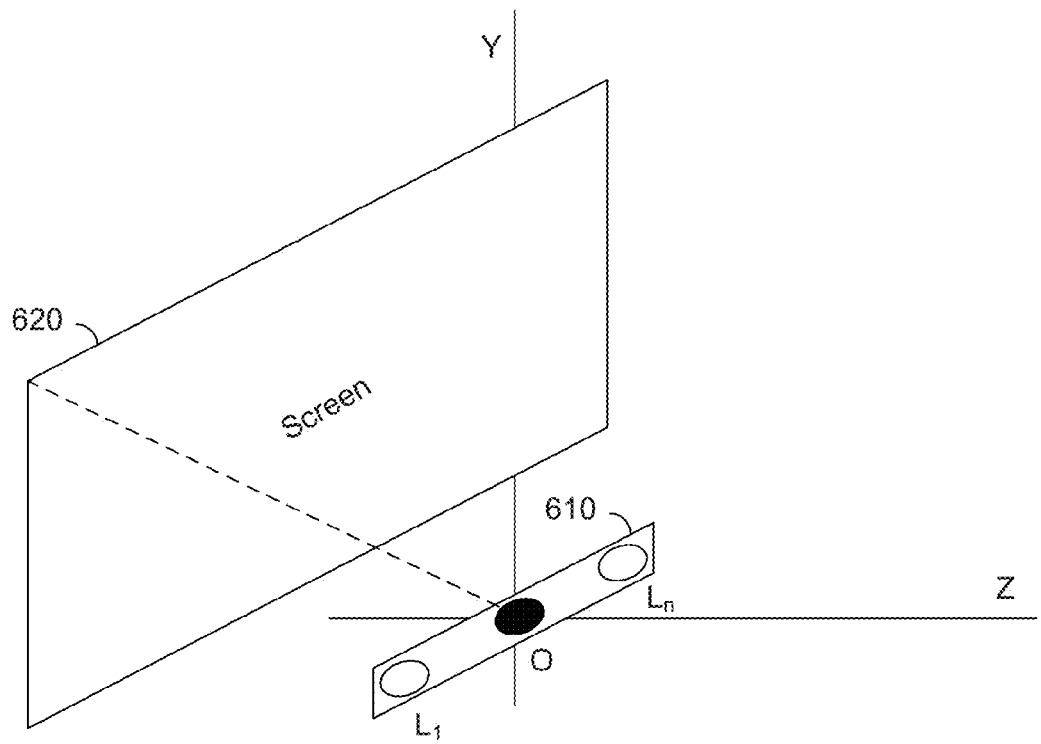
FIGS. 6A-6B are schematic diagrams depicting eye tracking technology relative to a display, according to some example embodiments.
Figure 6B:
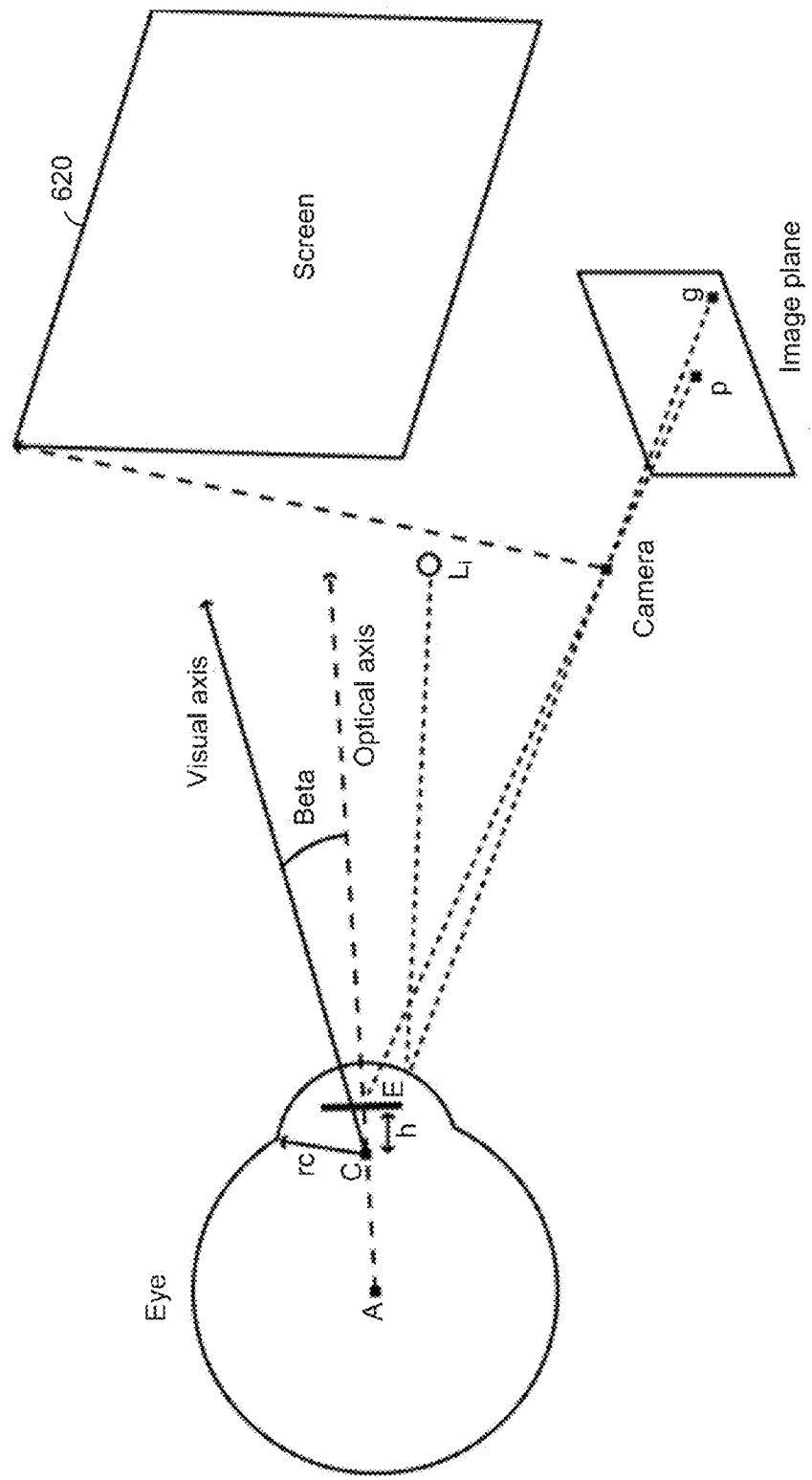

FIGS. 6A and 6B are schematic diagrams depicting eye tracking technology 610 relative to a screen 620. The screen 620 may be a rectangular screen having a height h and a width w. The eye tracking technology 610 includes one or more light sources $L_1$-$L_n$. In FIG. 6A, O is the center of the coordinate system XYZ. In some embodiments, the location of the one or more cameras and the one or more light sources $L_1$-$L_n$ with respect to O is known. In some embodiments, the location of the screen 620 with respect to O is known. In some embodiments, some camera parameters are known, including focal length, optical center, and the like. Using the known parameters, the unknown values can be determined.

In some embodiments, an eye tracking system may be built into a screen or may be mounted in a specific location on the screen, as described above. In this case, the hardware components are fixed and a one-time measurement may be sufficient for hardware calibration. When the eye tracking device is not fixed to the screen, a user may need to manually measure and input the distance between the device and the screen so that the eye tracking software may compute the on-screen gaze coordinates correctly after the user calibration.

The eye tracking system may capture information regarding the eye and face features of the user, including pupil center, pupil ellipse, corneal reflections, eye corners, face orientation, and the like. The pupil center is the point at the center of the detected pupil. A pupil ellipse is the elliptical representation in an image of a (circular) pupil. The eccentricity of the pupil ellipse is related to the angle between the direction of the user's gaze and the line from the camera to the eye. Corneal reflections are reflected light from the cornea. When the relationship between the light source L and the camera O is known, the position of corneal reflections of the light source, as measured relative to the pupil center, can be used to identify the gaze direction.

During the user calibration process, one or more objects may be displayed on the screen, and the user may look at these objects as they are being displayed. If two or more calibration objects are displayed at any given time, the system may identify which one the user is looking at by, for example, comparing the path followed by the calibration objects with the path followed by the eyes as they look at the objects. In some embodiments, the user calibration may happen when the user is instructed to look at a portion of the screen, such as the corners of the screen, at the light sources, and the like. While calibration objects are displayed, eye information is captured by the eye tracking software, including pupil center, pupil ellipse, corneal reflections, eye corners, face orientation, and the like.

FIG. 6B illustrates eye features to be calculated in 3-D space with respect to the origin O such that the visual axis may be computed and intersected with the screen plane. The location of the corneal reflections on the image plane, g, can be used in combination with the location of the light sources in 3-D space, L, with respect to the one or more cameras and the intrinsic parameters of the cameras to calculate the location of the cornea center in 3-D space, C. For example, a ray can be traced from each light source L to each camera via the cornea. Each light source camera pair provides a separate ray, and identifies a point on the surface of the cornea. By triangulating between these points, both the corneal radius and the location of C can be determined. When more cameras or light sources are used, the accuracy of the measurement can be increased.

The location of the pupil center on the image plane, p, can be used in combination with the location of the cornea center in 3-D space, C, the optical properties of the eye and air, and the intrinsic parameters of the cameras to calculate the location of the pupil center in 3-D space, E. For example, the camera captures an image of the pupil, but the actual position of the center of the pupil differs from the position directly indicated by the image because the pupil lies behind the cornea and light is refracted at the juncture between the cornea and the air. Accordingly, the apparent position of the pupil center is adjusted to take this refraction into account.

The location of the pupil center E and the location of the cornea center C in 3-D space define a vector, called optical axis. The actual line of sight, which may also be known as visual axis, has an angular offset with respect to the optical axis that can be computed through the user calibration. The angular offsets in x and y directions are known as alpha and beta and are usually around 5° horizontally and 1.5° vertically, but these values are personal and therefore need to be computed on a per-user basis.

Both alpha and beta can be computed by asking the user to look at a sequence of calibration targets displayed on known positions on both the screen and in 3-D space (in a hardware-calibrated setup, the location and size of the screen with respect to the camera(s) are known, hence the location of the calibration target in 3-D space is known).

Once the visual axis is known, the ray can be intersected with the screen plane. The intersection provides the on-screen gaze coordinates where the user is looking. Other eye parameters like the corneal radius or the distance between pupil center and corneal center can also be calculated during the user calibration process to improve the accuracy of the computation of on-screen gaze coordinates (due to a better estimation of the cornea center and hence optical and visual axes). Otherwise, average values can be used (e.g., 7.8 mm for the corneal radius).

To reduce the need for manual measurement of the hardware setup, the location and orientation of the screen in 3-D space with respect to the eye tracking device may be calculated during the calculation of the user-specific calibration parameters while maintaining a tolerance for head movement.

The gaze estimation described herein incorporates such calculation of hardware parameters in the calibration process used to calculate user-specific parameters, and may be relevant in situations where the hardware setup is not known prior to user-specific calibration. For example, this may be used in cases where an eye tracking device is a peripheral device that the user may place in various locations relative to a computing device or in cases where the user may be able to connect the eye tracking device to different types of computing devices (e.g., a laptop, a computer screen, a tablet, etc.). In each of these situations, the hardware configuration (e.g., the location and angle of the eye tracking device with respect to the screen) may be different, and the user may otherwise have to conduct a hardware calibration for each of the different computing devices (e.g., manually measure the distance between some pre-defined elements, such as the top left corner of the device, the top left corner of the screen, the angle between the device and the screen, etc.).

The total set of unknowns to be calibrated during said user calibration may include any unknown information, such as eye parameters (e.g., offset between optical and visual axes alpha and beta, corneal radius Rc, distance between pupil center and cornea center h, refraction indices n, etc.) and hardware parameters (e.g., screen location and orientation with respect to location of eye tracking device in 3-D space S, and screen size (width w, height h)). The information known prior to calibration may include a location of a light source with respect to the one or more cameras $L_1$-$L_n$, camera parameters of the one or more cameras (e.g., focal length, optical center, etc.), and the like.

In some example embodiments, the screen size (w, h) may be known or may be obtained programmatically through software (e.g., through an operating system API) and used as prior known information. In some embodiments, some of the eye parameters may take constant values to reduce the dimensional space of the unknowns.

Figure 7:
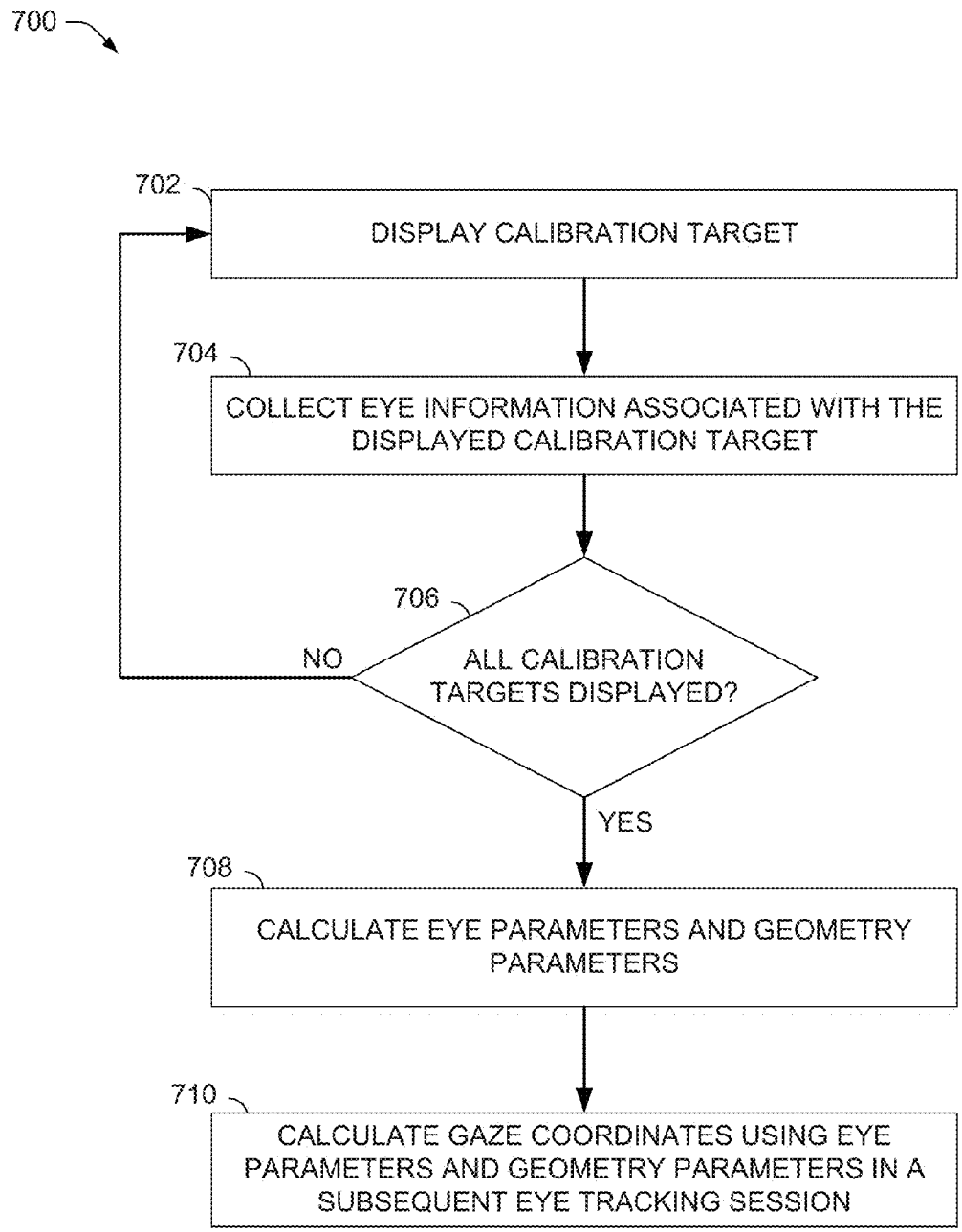
FIG. 7 is a flowchart of an example method of facilitating eye tracking calibration, according to some example embodiments.

FIG. 7 is a flowchart of an example method 700 of facilitating eye tracking calibration. In operation 702, a user-specific calibration target from a set of user-specific calibration targets is displayed on a display device of a computing system. The user-specific calibration targets may be displayed in any suitable manner.

In operation 704, while the calibration target is being displayed, eye information associated with the displayed calibration target is collected. The collection of eye information may include detecting and storing information such as pupil center, pupil ellipse, iris center, iris ellipse, corneal reflections on the image(s) captured by the camera(s), and the like. In some embodiments, if the only eye parameters to be calibrated are alpha and beta, pupil center(s) and cornea center(s) in 3-D space with respect to the camera may be computed at this stage.

In operation 706, the eye tracking application determines whether the set of calibration targets to be displayed has been displayed. If there are additional calibration targets within the set of calibration targets yet to be displayed, the eye tracking application returns to operation 702 to present the next calibration target and collect eye information associated with that calibration target (operation 704) accordingly.

In operation 708, when all calibration targets within the set of calibration targets have been displayed, the eye tracking application calculates the eye parameters and the geometry parameters using the image data (e.g., eye information) collected. The eye parameters and the geometry parameters may be calculated to minimize a cost function F that computes a metric using the estimated gaze coordinates (calculated using the eye parameters and the geometry parameters) and using the coordinates of the calibration targets. The cost function F may compute the metric by computing the cornea center(s) and the pupil center(s) in 3-D space using the set of eye parameters. The optical axis and the visual axis are computed using alpha and beta from the current set of eye parameters. In an example embodiment, the points in 3-D space where the visual axes of the eyes converge are computed. A geometrical relationship between the convergence points and the calibration targets (e.g., a plane P, a rotation and transformation matrix RT, a linear or non-linear mapping H, etc.) is calculated and stored as geometry parameters. In another example embodiment, the 3-D point, c, that minimizes the distance between all visual axes for a given calibration target can be computed. A geometrical relationship between the points $c_i$ for each target i and the calibration targets (e.g., a plane P, a rotation and transformation matrix RT, a linear or non-linear mapping H, etc.) is calculated and stored as geometry parameters. In yet another example embodiment, a global optimization finds the transformation that minimizes the accumulated distance between the lines of sight and the theoretical 3-D locations of the calibration targets. This transformation may include a plane P, a rotation and transformation matrix RT, and a linear or non-linear mapping H, and is stored as geometry parameters. In some example embodiments, said global optimization also optimizes for the eye parameters EP by minimizing the cost function F for all calibration parameters at once.

In operation 710, the gaze coordinates in a subsequent eye tracking session are calculated using the calculated eye parameters and geometry parameters in operation 708. The gaze coordinates (also referred to as the point of regard (PoR)) are calculated using the visual axis and the geometry parameters (e.g., as the intersection of the visual axis with the plane P).

Figure 8:
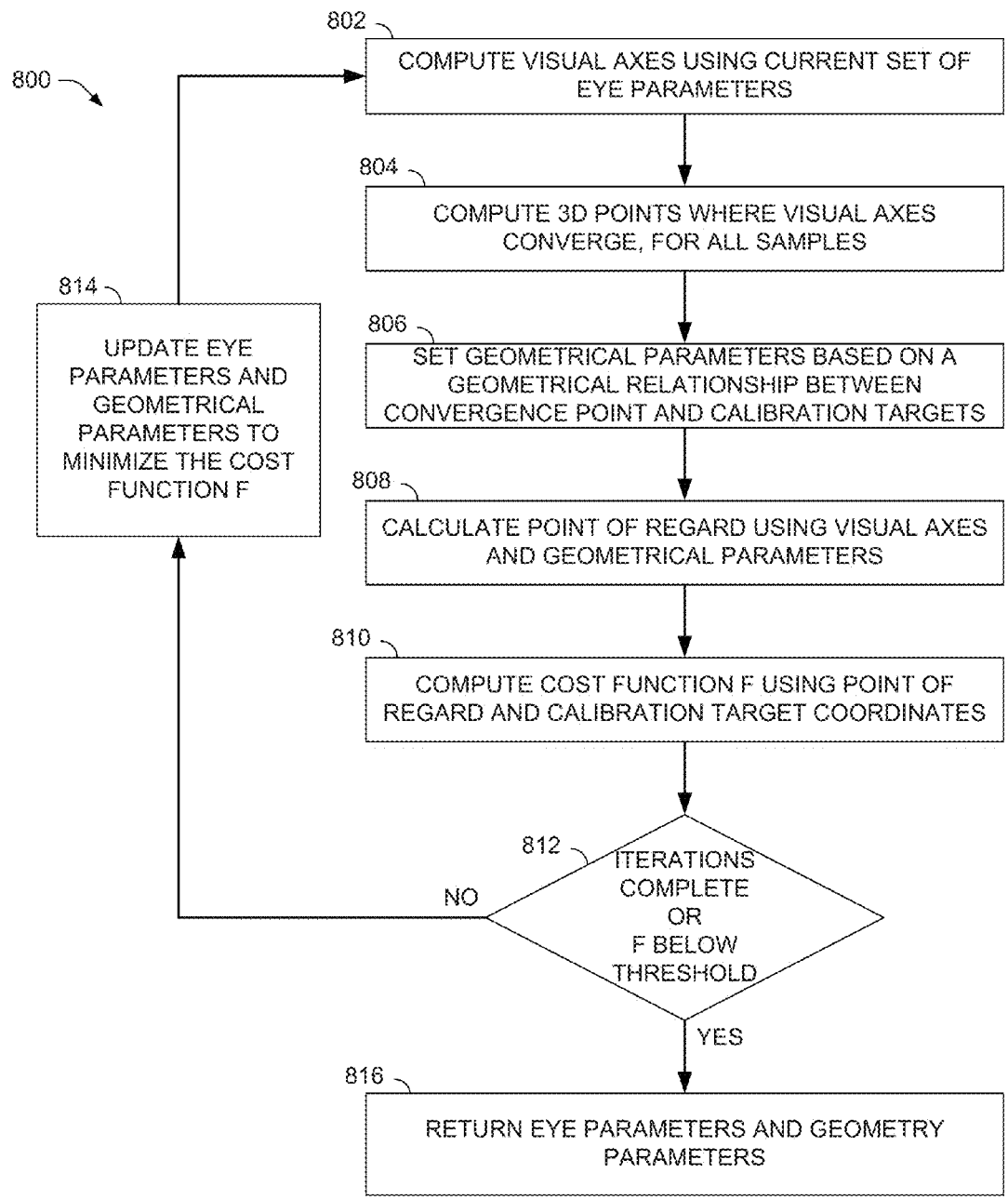
FIG. 8 is a flowchart of an example method of minimizing a cost function related to facilitating eye tracking calibration, according to some example embodiments.

FIG. 8 is a flowchart of an example method 800 of minimizing a cost function related to facilitating eye tracking calibration. The method 800 is capable of performing the optimization routine depicted in operation 708 of FIG. 7 used to calculate the set of eye parameters (EP) and geometry parameters (GP) that minimize a cost function F based on the distance between convergence points of the visual axes and the calibration targets.

In operation 802, the visual axes for a set of collected samples are computed from a given set of eye parameters. For example, pupil center(s) and cornea center(s) in 3-D space may be computed in this operation using other parameters from the current set of eye parameters, such as cornea radius and distance between pupil center and cornea center.

The points in 3-D space where the visual axes converge are calculated for each sample (operation 804) using the current eye parameters. Alternatively or additionally, the user's gaze along the visual axis of a single eye (or each eye) may be calculated for each sample using the current eye parameters. For example, eye information and object location data for the samples displayed in operation 704 may be stored and reevaluated using the current eye parameters to generate an updated estimate of the direction of the user's gaze.

A geometrical relationship between convergence points and calibration targets coordinates is found (operation 806). Alternatively or additionally, the intersection of the current estimate of the user's gaze with the current estimate of the plane of the screen may be used as an estimated 3-D focus point and a geometrical relationship between the estimated 3-D focus point and the calibration target coordinates may be found. The geometrical relationship may include finding a plane P that represents the screen in 3-D space, a rotation and transformation matrix RT, a non-linear mapping H, and the like. In some example embodiments, the geometrical relationship is calculated by minimizing the accumulated distance between the points of convergence (or intersection) for each target i, $c_i$, the theoretical target position, T, for a given transformation M of screen position and orientation. For example, the equation below may be used to determine the geometry parameters GP.

$$GP = \min_{\{Transformation\ M\}} (\Sigma_i |M(T_i) - c_i|)$$

The relationship found is stored as geometry parameters.

In operation 808, the gaze coordinates are computed using the visual axes and the geometry parameters GP. In some example embodiments, the gaze coordinates are computed as the intersection between visual axes with a plane P.

In operation 810, the cost function F is computed. The cost function F may depend on an error metric between gaze coordinates and calibration target coordinates.

In operation 812, if the cost function F is not minimized and the maximum number of iterations has not been reached, the algorithm updates eye parameters and geometry parameters in operation 814 such that the cost function F is minimized, and returns to operation 802.

In operation 816, if the cost function F is minimized, the computed set of eye parameters and geometry parameters that minimize the cost function F is returned.

Figure 9A:
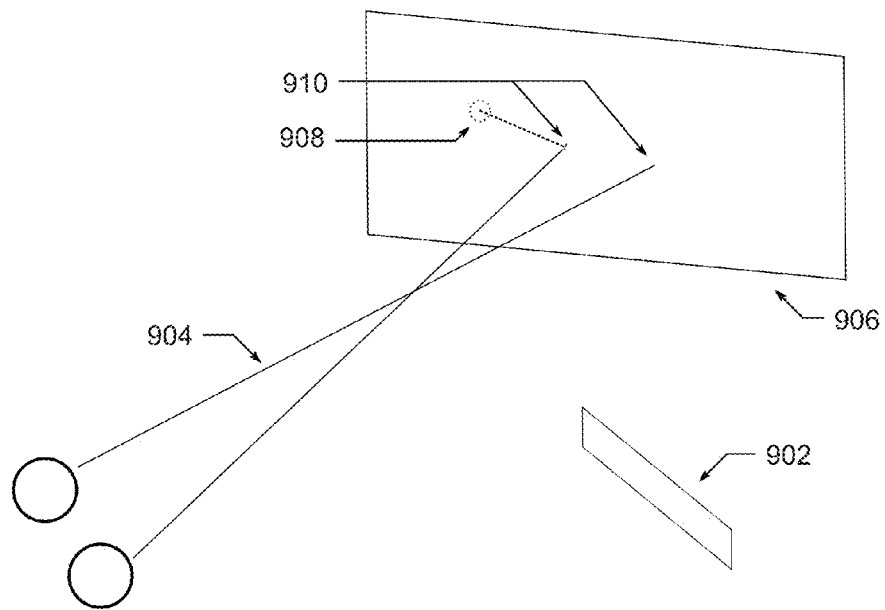
FIGS. 9A-9B illustrate calculated gaze coordinates before and after calibration, according to some example embodiments.

FIG. 9A illustrates a starting point for the computation of eye parameters and geometry parameters, for a given calibration target. Visual gaze vectors 904 are computed with respect to the device 902, for a given set of eye parameters. A given screen position 906, defined by the initial geometry parameters, is then evaluated and a metric based on the onscreen distance between the theoretical target position 908 and the point of regard 910 is computed. This metric is to be minimized in order to reduce the distance between gaze coordinates and theoretical target position 908.

Figure 9B:
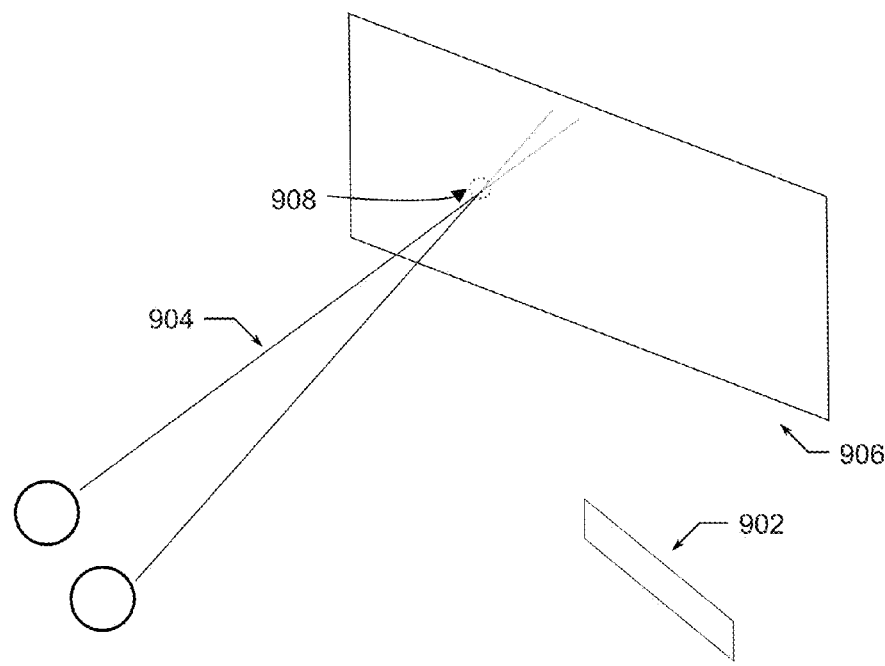

FIG. 9B illustrates the end of the process described by method 800. Once the metric has been optimized, the computed set of eye parameters (e.g., the offsets between the visual and optical axis of each eye) and geometry parameters (e.g., the screen location and orientation with respect to the device 902) minimize the distance between gaze coordinates and theoretical target position 908 for a given calibration target.

Though FIGS. 9A-9B show an embodiment in which the convergence of the two visual axes of the two eyes of the user is used to determine the location in 3-D space of the display relative to the camera, embodiments using a single eye are also contemplated. For example, once alpha and beta for an eye are known, and the visual axis for the eye can be determined accurately from an image of the eye, each time the user looks at a displayed object, a point on the surface of the display is determined. By determining the location of objects (e.g., three non-colinear points) on a planar display, geometry parameters (e.g., the plane of the display) can be determined. Furthermore, when the distance and direction between those points and the edges of the display are known, the orientation of the display can also be determined. In some example embodiments, more than three displayed objects are used. For example, additional objects may be used to increase confidence in the determined geometry parameters, to provide additional data to be used in determining calibration parameters, or both.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
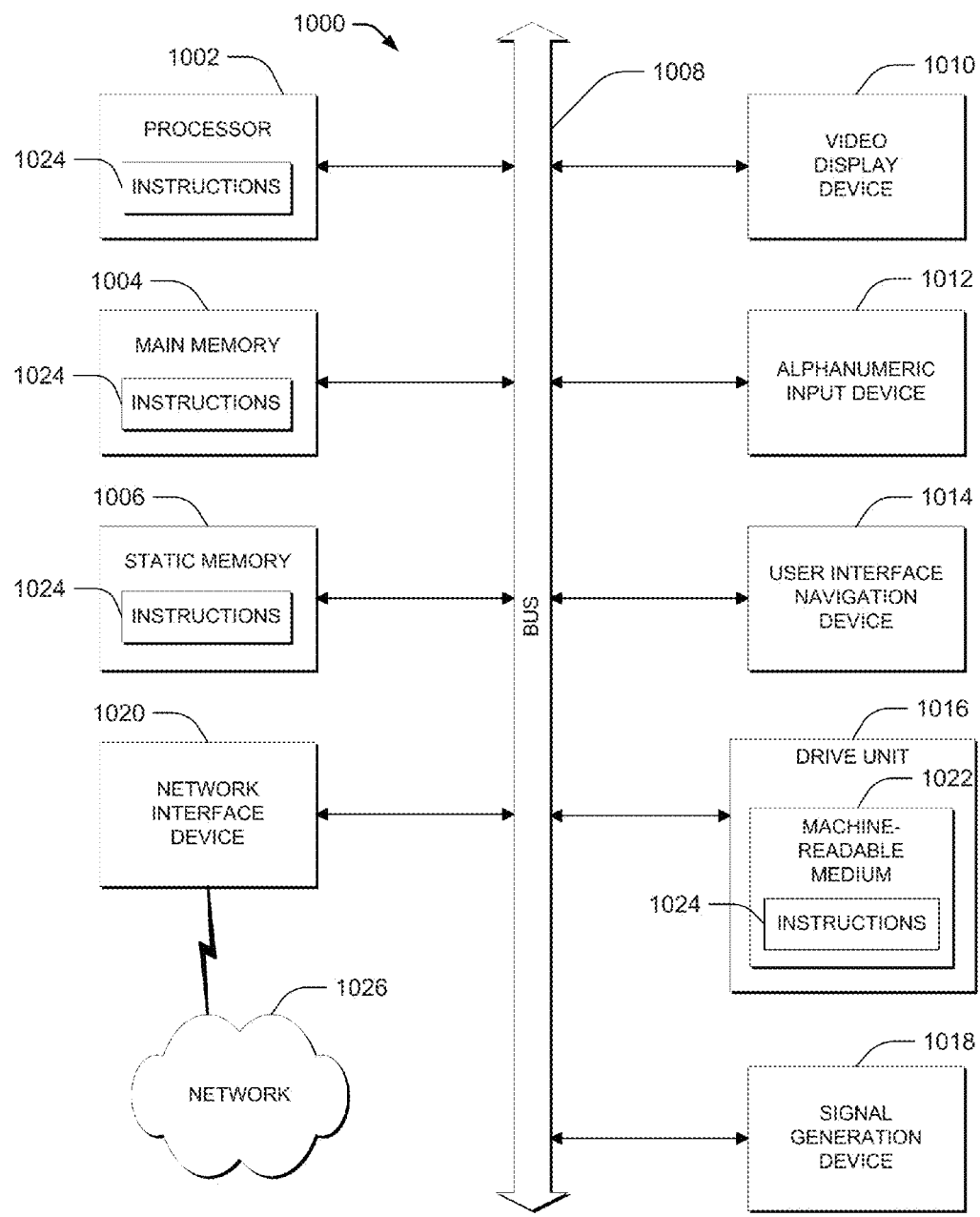
FIG. 10 is a block diagram of a machine in the example form of a computer system within which a set of instructions, for causing the machine to perform any one or more of the methodologies discussed herein, may be executed, according to some example embodiments.

FIG. 10 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes a processor 1002 (e.g., a CPU, a GPU, or both), a main memory 1004, and a static memory 1006, which communicate with each other via a bus 1008. Computer system 1000 may further include a video display device 1010 (e.g., a liquid crystal display (LCD) or a cathode ray tube (CRT)). Computer system 1000 also includes an alphanumeric input device 1012 (e.g., a keyboard), a user interface (UI) navigation device 1014 (e.g., a mouse or touch sensitive display), a disk drive unit 1016, a signal generation device 1018 (e.g., a speaker), and a network interface device 1020.

Disk drive unit 1016 includes a machine-readable medium 1022 on which is stored one or more sets of data structures and instructions 1024 (e.g., software) embodying or utilized by any one or more of the methodologies or functions described herein. Instructions 1024 may also reside, completely or at least partially, within main memory 1004, within static memory 1006, and/or within processor 1002 during execution thereof by computer system 1000, with main memory 1004 and processor 1002 also constituting machine-readable media.

While machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present technology, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 1024 may further be transmitted or received over a communications network 1026 using a transmission medium. Instructions 1024 may be transmitted using network interface device 1020 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although specific example embodiments have been disclosed, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    displaying one or more objects in sequence on a display of a computing device in communication with an eye tracking device, each object being associated with a calculation of eye parameters relating to a calculation of gaze information of a user of the computing device;
    while each object of the one or more objects is displayed, receiving, from the eye tracking device, a corresponding image of at least one eye of the user;
    determining, for each of the one or more corresponding images, eye feature information associated with the at least one eye of the user; and
    after all of the one or more objects have been displayed and the corresponding images have been received, calculating one or more of the eye parameters and one or more geometry parameters based on the eye feature information, wherein the one or more geometry parameters indicate information associated with a location and orientation of the display relative to the eye tracking device;
    computing a cost function based on the calculated eye parameters and geometry parameters; and
    updating the calculated eye parameters and geometry parameters by minimizing the cost function.

2. The method of claim 1, further comprising:
    displaying a second one or more objects in sequence on the display of the computing device;
    while each second object of the one or more second objects is displayed, receiving, from the eye tracking device, a corresponding second image of the at least one eye of the user;
    determining, for each of the one or more corresponding second images, corresponding second eye information associated with the user based on said each second image, the one or more eye parameters, and the one or more geometry parameters; and
    adjusting one or more of the eye parameters or the geometry parameters based on the second eye information and locations of the one or more second objects on the display of the computing device.

3. The method of claim 2, further comprising:
    calculating an error measurement based on the one or more eye parameters, the one or more geometry parameters, the eye feature information of the user, and locations of the one or more objects on the display;
    determining that the error measurement exceeds a threshold; and
    wherein the displaying of the second one or more objects is based on the error measurement exceeding the threshold.

4. The method of claim 1, wherein the minimizing of the cost function minimizes an error between an estimated point of regard and display coordinates of the object.

5. The method of claim 1, wherein the minimizing of the cost function minimizes a distance between a set of visual axes and 3-D coordinates of the object.

6. The method of claim 1, wherein the one or more objects are a single object and the one or more corresponding images are a single image.

7. A non-transitory machine-readable storage medium storing instructions which, when executed by one or more processors, cause the one or more processors to perform operations comprising:
    displaying one or more objects in sequence on a display of a computing device in communication with an eye tracking device, each object being associated with a calculation of eye parameters relating to a calculation of gaze information of a user of the computing device;
    while each object of the one or more objects is displayed, receiving, from the eye tracking device, a corresponding image of at least one eye of the user;
    determining, for each of the one or more corresponding images, eye feature information associated with the at least one eye of the user; and
    after all of the one or more objects have been displayed and the corresponding images have been received, calculating one or more of the eye parameters and one or more geometry parameters based on the eye feature information, wherein the one or more geometry parameters indicate information associated with a location and orientation of the display relative to the eye tracking device;
    computing a cost function based on the calculated eye parameters and geometry parameters; and
    updating the calculated eye parameters and geometry parameters by minimizing the cost function.

8. The non-transitory machine-readable storage medium of claim 7, wherein the operations further comprise:
    displaying a second one or more objects in sequence on the display of the computing device;
    while each second object of the one or more second objects is displayed, receiving, from the eye tracking device, a corresponding second image of the at least one eye of the user;

determining, for each of the one or more corresponding second images, corresponding second eye information associated with the user based on the second image, the one or more eye parameters, and the one or more geometry parameters; and adjusting one or more of the eye parameters or the geometry parameters based on the second eye information and locations of the one or more second objects on the display of the computing device.

9. The non-transitory machine-readable storage medium of claim 8, wherein the operations further comprise:

calculating an error measurement based on the eye parameters, the geometry parameters, the eye feature information of the user, and locations of the one or more objects on the display;

determining that the error measurement exceeds a threshold; and wherein the displaying of the second one or more objects is based on the error measurement exceeding the threshold.

10. The non-transitory machine-readable storage medium of claim 7, wherein the minimizing of the cost function minimizes an error between an estimated point of regard and display coordinates of the object.

11. The non-transitory machine-readable storage medium of claim 7, wherein the minimizing of the cost function minimizes a distance between a set of visual axes and 3-D coordinates of the object.

12. The non-transitory machine-readable storage medium of claim 7, wherein the one or more objects are a single object and the one or more corresponding images are a single image.

13. A device comprising:

a display;

a hardware-implemented display module configured to:
display one or more objects in sequence on a display of a computing device in communication with an eye tracking device, each object being associated with a calculation of eye parameters relating to a calculation of gaze information of a user of the computing device; and a hardware-implemented eye tracking module configured to:
while each object of the one or more objects is displayed, receive, from the eye tracking device, a corresponding image of at least one eye of the user;
determine, for each of the one or more corresponding images, eye feature information associated with the at least one eye of the user; and
after all of the one or more objects have been displayed and the corresponding images have been received, calculate one or more of the eye parameters and one or more geometry parameters based on the eye feature information, wherein the one or more geometry parameters indicate information associated with a location and orientation of the display relative to the eye tracking device;
compute a cost function based on the calculated eye parameters and geometry parameters; and
update the calculated eye parameters and geometry parameters by minimizing the cost function.

14. The device of claim 13, wherein:

the hardware-implemented display module is further configured to:
display a second one or more objects in sequence on the display of the device;
the hardware-implemented eye tracking module is further configured to:
while each second object of the second one or more objects is displayed, receive, from the eye tracking device, a corresponding second image of the at least one eye of the user;
determine, for each of the one or more corresponding second images, corresponding second eye information associated with the user based on the second image and the one or more eye parameters, and the one or more geometry parameters; and
adjust one or more of the eye parameters or the geometry parameters based on the second eye information and locations of the second one or more objects on the display of the device.

15. The device of claim 14, wherein the hardware-implemented eye tracking module is further configured to:

calculate an error measurement based on the one or more eye parameters, the one or more geometry parameters, the eye feature information of the user, and locations of the one or more objects on the display;

determine that the error measurement exceeds a threshold; and wherein the displaying of the second one or more objects is based on the error measurement exceeding the threshold.

16. The device of claim 13, wherein the minimizing of the cost function minimizes an error between an estimated point of regard and display coordinates of the object.

17. The device of claim 13, wherein the minimizing of the cost function minimizes a distance between a set of visual axes and 3-D coordinates of the one or more objects.

18. The device of claim 13, wherein the one or more objects are a single object and the one or more corresponding images are a single image.

* * * * *